Aug. 10, 1926.

C. J. ZIMMERMANN

GASOLINE FUNNEL

Filed July 13, 1921

1,595,134

INVENTOR
Cyrus J. Zimmermann
BY
J. F. Brandenburg
ATTORNEY

Patented Aug. 10, 1926.

1,595,134

UNITED STATES PATENT OFFICE.

CYRUS J. ZIMMERMANN, OF KEYPORT, NEW JERSEY, ASSIGNOR TO AEROMARINE PLANE & MOTOR COMPANY, OF NEW YORK, N. Y., A CORPORATION OF NEW YORK.

GASOLINE FUNNEL.

Application filed July 13, 1921. Serial No. 484,285.

The object of this invention is to provide a gasoline funnel which positively prevents the entrance of water and sediment into the gasoline tanks, an insurance which is particularly important for aircraft purposes.

Figure 1:
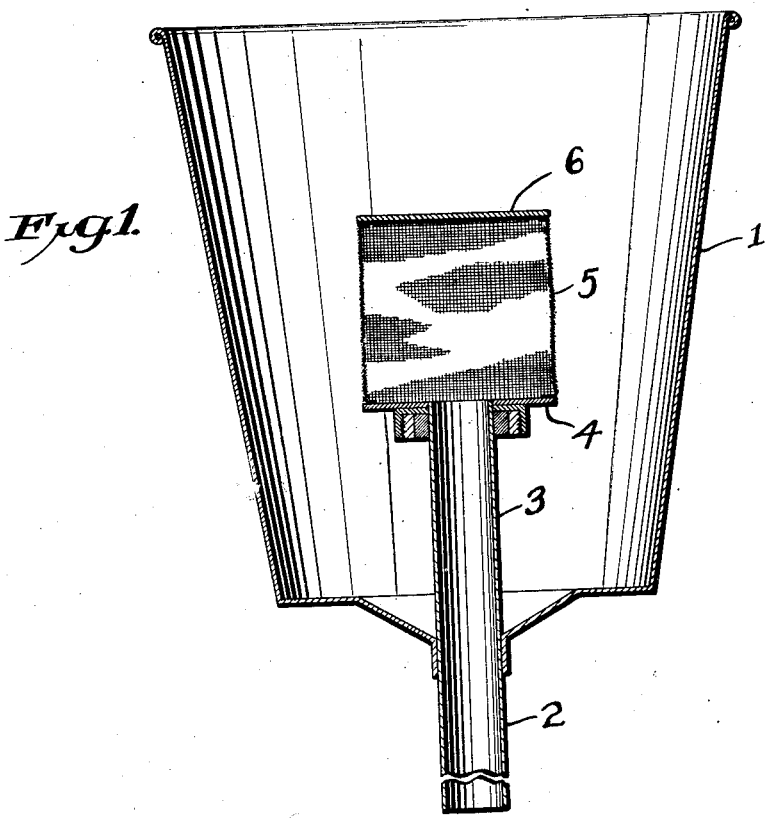
Figure 2:
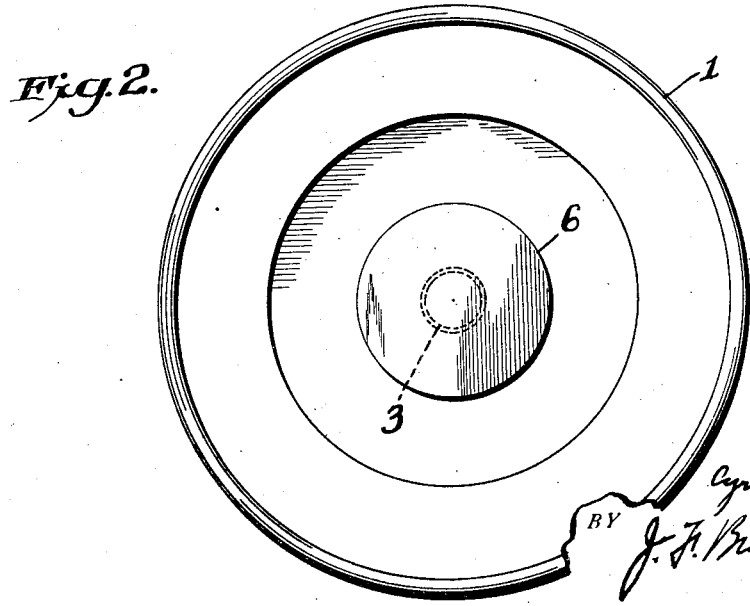

In the accompanying drawings illustrating a preferred and simple embodiment of the invention:

Fig. 1 is a sectional elevation; and
Fig. 2 is a plan.

In these views the numeral 1 designates the cup or flaring portion of the funnel, and 2 the downwardly-projecting spout. A tube 3 extends upward in continuation, integral or otherwise, with the spout 2, within the lower part of the cup 1, so that the gasoline in order to reach the spout must pass through an elevated outlet at the upper end of this tube or duct.

On the upper end of the tube 3 is attached a plate or ring 4, which bears a cylindrical screen 5, the enclosure of which is preferably larger than the diameter of the tube. On the top of the screen enclosure is an impervious cover plate or shield 6. The screen is of fine mesh, preferably about 100 mesh, and because of its upright position and the cover 6 is protected from direct impingement by the gasoline poured into the funnel. The plate 4 projecting laterally from the tube 3 constitutes a baffle, which keeps a good deal of the sediment from reaching the screen at all.

The liquid impinges on the top of the screen cover and runs down the side of the screen, collecting on the bottom of the funnel. The gasoline, which is lighter than the water, filters through the screen and runs into the tank, while the water and sediment are trapped in the bottom of the cup, which constitutes a sump. After the filtering process the funnel is emptied of the water and dirt, which is thus collected.

The screen and shield being supported by the tube 3, centrally of the cup and in an elevated position, leaves the bottom of the cup entirely accessible for cleaning and permits the residual liquid in the sump to be poured out readily.

What I claim as new is:

A funnel having a cup and a spout, a tube in continuation with the spout extending upward in the cup, a laterally projecting baffle plate on the upper end of the extension tube a considerable distance above the bottom of the cup, a cylindrical screen rising from said plate, and a shield on top of the screen, both the screen and shield being supported centrally of the cup in such manner as to leave the sump in the lower part of the cup entirely open and accessible.

CYRUS J. ZIMMERMANN.